June 20, 1950

G. R. DUNCAN
MEANS FOR MILKING AND HANDLING
THE MILK OF FARM ANIMALS 2,512,094

Filed April 25, 1949

INVENTOR,
George R. Duncan
BY
ATTORNEYS

INVENTOR.
George R. Duncan
ATTORNEYS.

June 20, 1950

G. R. DUNCAN
MEANS FOR MILKING AND HANDLING
THE MILK OF FARM ANIMALS 2,512,094

Filed April 25, 1949

INVENTOR.
George R. Duncan
BY
*Mason & Mason*
ATTORNEYS

Patented June 20, 1950

2,512,094

UNITED STATES PATENT OFFICE 2,512,094

MEANS FOR MILKING AND HANDLING THE MILK OF FARM ANIMALS

George R. Duncan, Washington, Mo.

Application April 25, 1949, Serial No. 89,374

13 Claims. (Cl. 31—58)

This invention relates to means for milking farm animals such as cows or goats, and handling milk in an expeditious and sanitary manner, such that the milk as it comes from the farm animals is untouched by human hands. The invention includes a structure for leading the animals to the milking stall means, and means for conducting the milk, as it comes from the animal, to a refrigerated container, which container is provided with means for cooling the milk and maintaining the milk at the proper temperature, say, about 50° F. with water at about 33° F.

An object of the invention, therefore, is to provide a sanitary milking structure whereby the animals are led to the structure, are milked, and the milk is immediately conducted by a conduit from the teat cups, directly from the animal to a refrigerated container, without being touched by human hands.

Another object is to provide a structure where the animals are stationed while the milking operation proceeds, that is, separated by a wall or partition from the milk-containing and refrigerating means, with conduit means connected to the teat cups as attached to the animals, the conduit means extending from the cups through, or around, the wall or partition, to the milk can forming the container means, the latter being located in the refrigerating means.

A further object of the invention is to provide means for milking and for handling milk, which includes a milk house that is separated from the place where the animals are milked, the milk house containing the refrigerated container having a plurality of milk cans therein, and conduits from the cans leading out of the milk house to the milking machine that is located in the stalls where the animals to be milked are located.

An additional object of the invention is to provide a structure for expeditiously and hygienically handling the milking of a plurality of farm animals, whereby these animals, whether they be cows or goats, may be led to a milking barn or enclosure and secured in proper position for milking and in immediate proximity to a milk house that contains a refrigerated container in which are located conventional milk cans.

Yet another object of the invention is to provide a structure in accordance with the preceding paragraph, wherein flexible conduits are provided which connect the milking machine that is attached to the cow's udder, in order that milk may be drawn directly from the cow's udder into the milk cans located in the refrigerated container.

A further object of the invention is to provide, in a milking barn, means for causing one or more of the farm animals to be located in an elevated position during the milking operation and an aisle for the convenience of the milking operator located below this elevated position, whereby the teat cups can be readily attached to the cow's udder and one or more cows may be simultaneously milked in an expeditious and sanitary manner. The aisle is preferably located between a wall of the barn and the elevated stand used by the farm animals while being milked.

Further objects will appear hereinafter throughout the specification.

Among the further objects which will be described herein are the following: the provision in a milking system, as hereinbefore described, of a meter which is so located as to measure the milk of the farm animal during the milking operation.

A weighing device which weighs the milk directly as it comes from the cow, and before it is led into the milk cans located within the refrigerating container.

The combination of a milking stall and milk house, the former constructed so as to permit the cow to be led into the milking parlor from one direction and led out of the same in another direction, and wherein the milk house is provided with a mechanical refrigerator adapted to hold a plurality of the milk cans.

Figure 1:
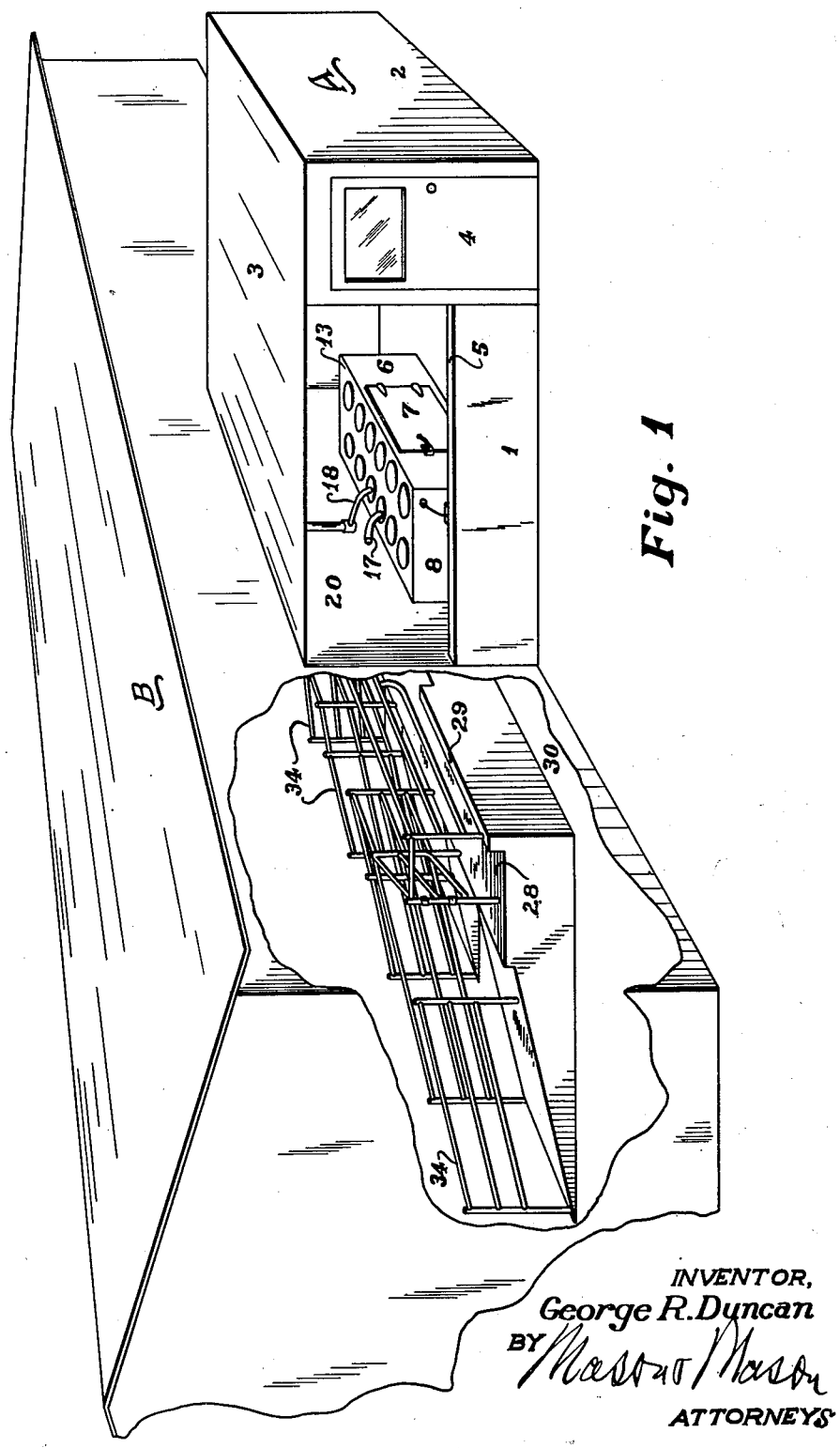
Figure 1 is a perspective view of the barn with wall portions cut away, and the adjoining milk house.
Figure 2:
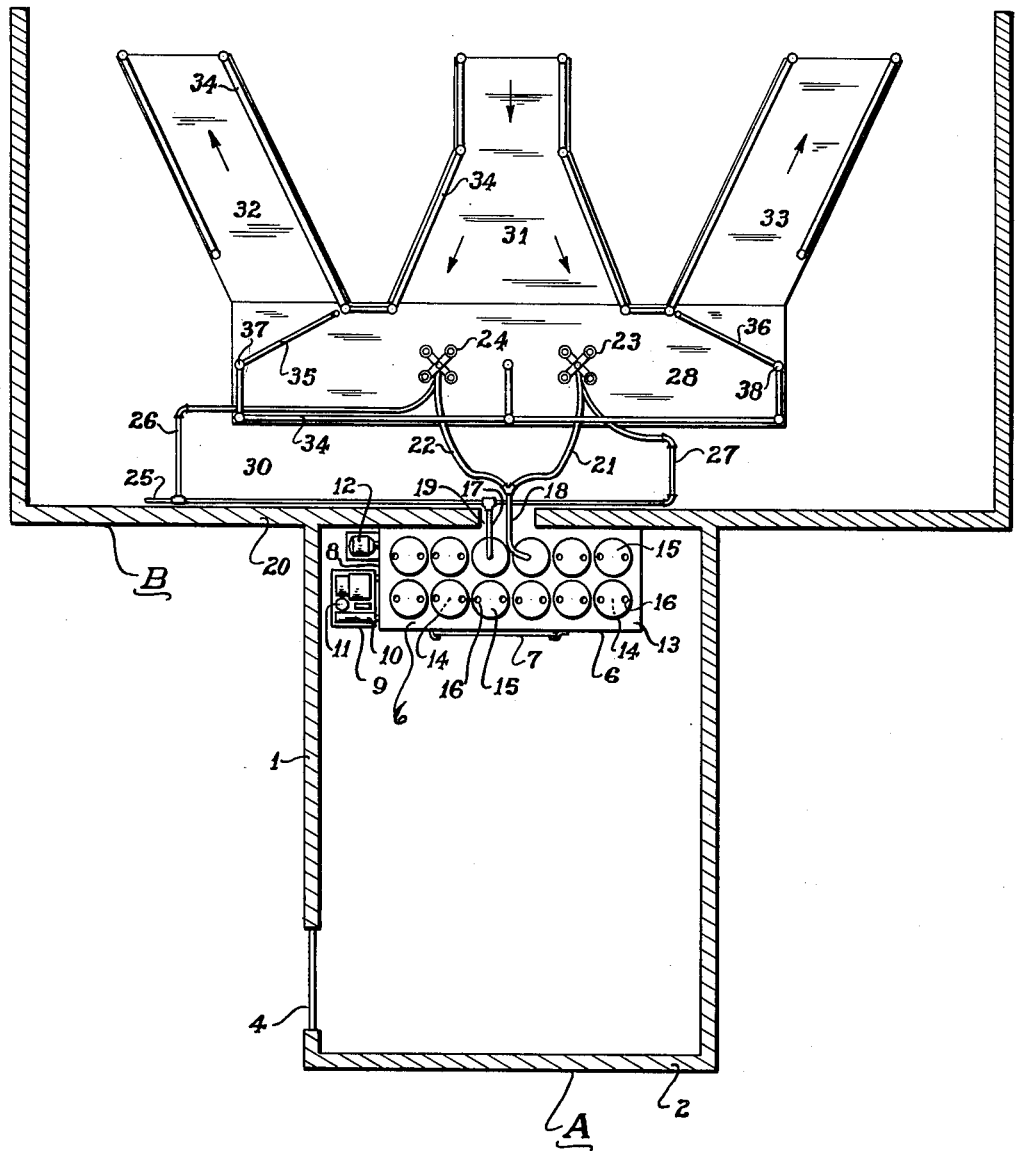
Figure 2 is a horizontal section of the structure shown in Figure 1, with parts shown in plan.

Referring to Figures 1 and 2 of the drawings, the letter A designates the milk house and the letter B the barn. Neither the barn nor the milk house is essential in the combination, but it is preferable to provide a milk house for the protection of the refrigerating means and to enclose the milking stall structure shown in the drawings in some type of enclosure, in order to protect the animals, while being milked, from inclement weather conditions.

Referring to the milk house, the exact structure of which is of no particular importance, it will be noted that it is provided with walls 1 and 2 and a roof 3. Wall 1 may be provided with a door 4 and this wall is also provided with a viewing window 5, which may or may not be provided with glass.

Located within the milk house is a milk refrigerator 6 which is provided with a side door 7 for access to the interior thereof. Preferably mounted on one of the end walls 8 of the refrigerator is support 9 on which is located the refrigerating mechanism designated generally 10, and this mechanism has regulating means 11 whereby the temperature of the refrigerating coils may be adjusted, so as to raise or lower the temperature of the refrigerant. The refrigerator is preferably driven by the motor 12 which is connected by a suitable belt drive, not shown. It is, of course, obvious that a gas refrigerator, such as a "Servel" type, may be used in place of the motor-driven refrigerator shown.

The top of the refrigerator 13 is provided with a plurality of apertures 14 which are closed by covers 15, each cover preferably being provided with apertures 16 for connection of the milk pipes shown at 17 and 18. These two pipes extend, as shown in Figure 2, through an opening 19 in the wall 20 which is common to both the milk house and the barn. If no barn is used, the wall 20 forms one end of the milk house. As will be seen by referring to Figure 2, the milk line 18 has branches 21 and 22, each one of which leads to a plurality of teat cups 23 and 24. The vacuum line 25 is connected to a vacuum pump of a milking machine, not shown, and this pump may be of any suitable well-known type. The line 25 is provided with branches 26 and 27 which also lead to the teat cups 23 and 24. The line 17 is connected with line 25, as shown in Figure 2.

Provision is made for leading the farm animals, hereinafter referred to as cows, which are to be milked, up on the raised platform 28 having a curb 29, as seen in Figure 1. Between the platform 28 and the wall 20 is a passageway 30 for the milking operator.

As seen in Figure 2 of the drawings 31 is a ramp which forms an inlet for the cows. The present disclosure shows a layout for simultaneously milking two cows. The cows are positioned preferably facing in opposite directions, so that the teat cups 23 and 24 may be applied. After the milking operation is completed, the attendant, who occupies the passageway 30, detaches the teat cups 23 and 24 and opens the gates, hereinafter described, whereupon the cow which faces the exit ramp 32 uses this ramp, and the cow which faces the ramp 33 uses this ramp, to return to their respective stalls, or to the field. The three ramps 31, 32 and 33, and platform 28, are enclosed by suitable fence means, such as the piping 34 shown in the several figures. In order to maintain the cows in proper milking position during the milking operation, there are provided pivotal gates 35, 36, these gates being pivoted at 37, 38, respectively. As seen in Figure 2, the gates are in their closed positions.

Referring, again, to the refrigerator, the same may be constructed in accordance with my Patent No. 2,425,519, or my pending application, filed June 13, 1946, Serial No. 676,368, now Patent No. 2,470,979, granted May 24, 1949.

This application is a continuation-in-part of my application filed May 26, 1948, Serial No. 29,336, now Patent 2,482,579, granted September 20, 1949.

In the refrigerator of my application filed concurrently herewith Ser. No. 89,375, now Patent No. 2,498,401, granted February 21, 1950, and in my prior Patent No. 2,425,519, the milk in the cans is maintained at a temperature of, preferably, 50° F., by means of water sprays, the water itself being maintained at the proper temperature by the refrigerating mechanism. Other refrigerating apparatus may be substituted for those shown in the above-noted application and patent.

As disclosed in my application filed concurrently herewith Serial No. 89,375, now Patent No. 2,498,401, granted February 21, 1950, the milk is caused to fill one can after another, whereby each of the cans, not shown, gradually becomes filled with milk as it comes from the cows. However the construction of filling one can after another is not essential although preferable in the present construction, as other means may be providing for filling each can separately or for filling only one can.

Figure 3:
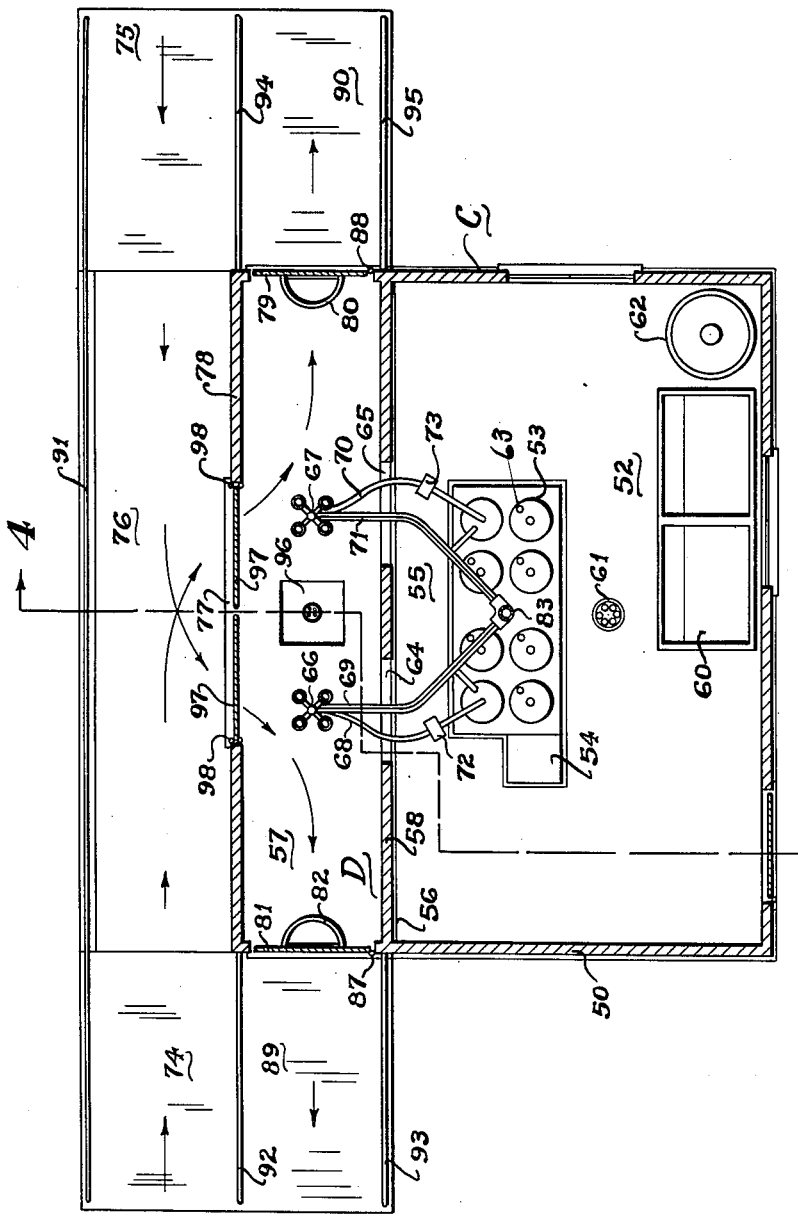
Figure 3 is a horizontal section of a second embodiment of the invention, with parts shown in plan.
Figure 4:
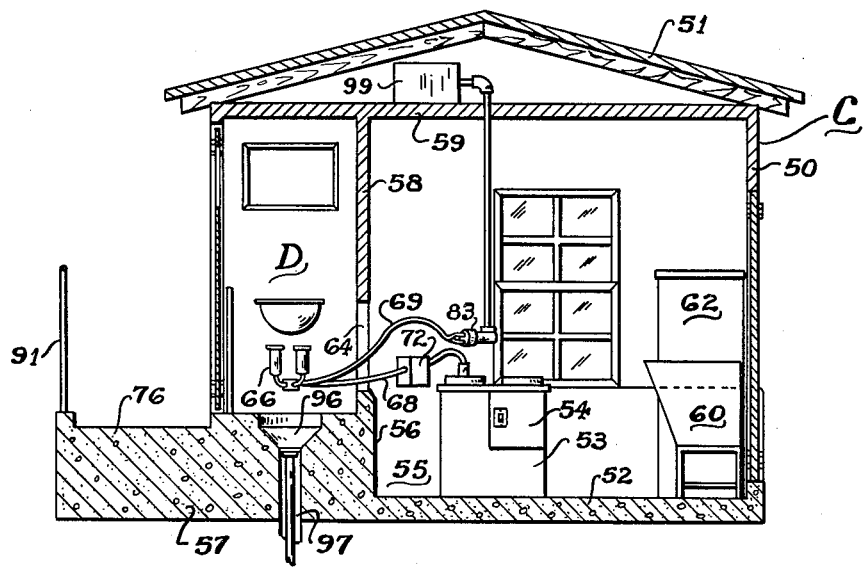
Figure 4 is a vertical section of the structure shown in Figure 3 taken on the lines 4—4 of Figure 3.

Referring to Figures 3 and 4, the letter C designates the milk house and the letter D the milking parlor. The milk house is preferably provided with walls 50 and a roof 51.

The milk house is provided with a floor 52, a mechanical refrigerator 53 having refrigerating mechanism 54. An aisle 55 is provided between the refrigerator, and a wall 56 of the ramp 57. The wall 56 is provided with an upwardly extending portion 58 which joins the ceiling 59.

Within the milk house are also located suitable sanitary apparatus for maintaining the milk house, the refrigerator and milk cans in sanitary condition, such as the tubs 60, the drain 61 in the floor 52, and the circular container 62 for heating hot water. The refrigerator may be of the type shown and described in one of my co-pending applications or patent above noted, or may be of any other suitable construction to accomplish the purpose intended. As shown in the figures, the refrigerator is provided with a plurality of openings having covers for said openings designated 63.

The upper portion 58 of the wall 56 is provided with one or more openings, two of these being shown as indicated at 64 and 65.

The teat cups 66 are provided with a milk pipe 68 and a suction pipe 69 and the teat cups 67 are provided with a milk pipe 70 and a suction pipe 71. Located in each milk pipe 68 and 70 are meters 72 and 73, respectively, whereby the amount of milk may be registered as it comes from each cow.

The ramp 57 is provided with inclined surfaces 74 and 75 forming inlets to the ramp and leading to the center raised portion 76.

The milk parlor proper is designed to accommodate two cows during the milking operation. The cow which passes over the inclined surfaces 74 after reaching the elevated portions 76 passes through the opening 77 in the partition 78 and is tied by suitable means, not shown, to the door 79 where it may feed at the feeding device 80. The cow which enters at the inclined portion 75 after reaching the elevated portion 76 passes through the opening 77 and is tied to the door 81 where it may feed at the feeding device 82.

The doors 79 and 81 may be pivoted at 87 or 88, respectively. Following the milking operation, the doors 79 and 81 are swung to their open positions, not shown, in order that the cows may be led down the inclined portions 89 and 90, as shown by the arrows. A railing or other guiding device 91 may be provided on the open side of the ramp 57. Other guide rails 92, 93, 94 and 95 are provided to guide the animals during their entrance and exit from the milking parlor, as seen in Figure 3. A drain or sump 96 is provided, as shown in these figures.

The structure shown in Figures 3 and 4 provides a readily accessible milking parlor-milk house combination whereby a plurality of cows may be milked simultaneously, the milk passing directly from the teat cups into cans (not shown) located within the refrigerator 53.

Figure 7:
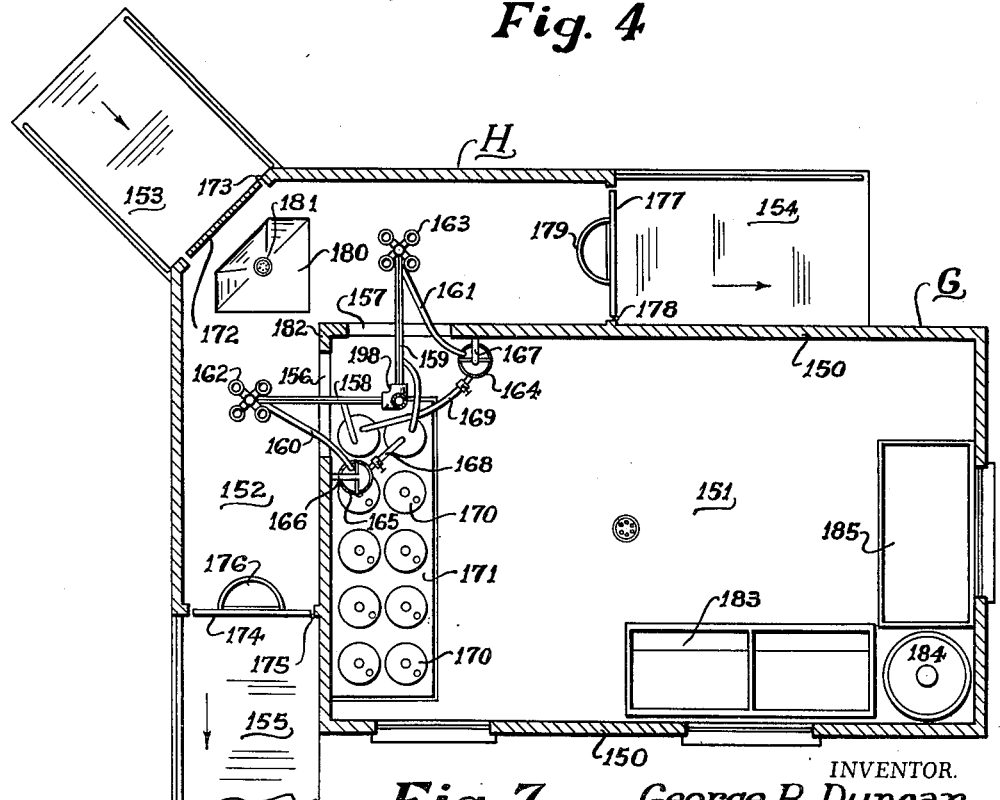
Figure 7 is a horizontal section of a fourth embodiment of the invention.

Instead of the meters hereafter described, a container (not shown) may be used to weigh the milk, as under some conditions a weighing device may be more accurate than a meter, such as shown in 164 and 165 in Fig. 7 herein.

The numeral 83 indicates a pipe union whereby the source of suction 99 may be connected to suction pipes 69 and 71.

It will be noted that, following the milking operation of one cow, or both of them, the cows may be led away by separate passageways so that another cow or two new cows may be immediately led in through the inlet passageways to take the place of the cows which have been milked. This construction provides a minimum loss of time to the milking operator and it also permits the milking of a maximum number of animals within a minimum of time. Moreover, the location of the passageway 55 below the level of the raised portion of the ramp 57 enables the milking operator to readily attach and detach the teat cups, and to inspect the milking machine and meter and the conduits leading to the milk cans during and after each milking operation. Suitable notes may be taken by the operator following the milking of each cow, as he may read the meter and reset the same for the succeeding milking operation. The entire procedure whereby a plurality of cows are milked insures maximum sanitation and efficient operation during the milking of a herd of cows or any number of animals which require to be milked.

The opening 77 is closed by a pair of hinged doors 97, hinged at 98. Suitable springs, not shown, may be used to resiliently hold the doors in the position shown in Figure 3, in the same manner that pantry doors in houses are maintained in closed position.

The milk and vacuum lines may, of course, be led to the milk cans within the refrigerator by conduits that extend through the sides or even the bottom of the refrigerator, but the manner of leading these lines into the refrigerator is not a part of the present invention, as any suitable construction may be used. The numeral 99 indicates any suitable milking machine for applying a vacuum to the teat cups and cans through the pipe connections shown in the drawings.

Figure 5:
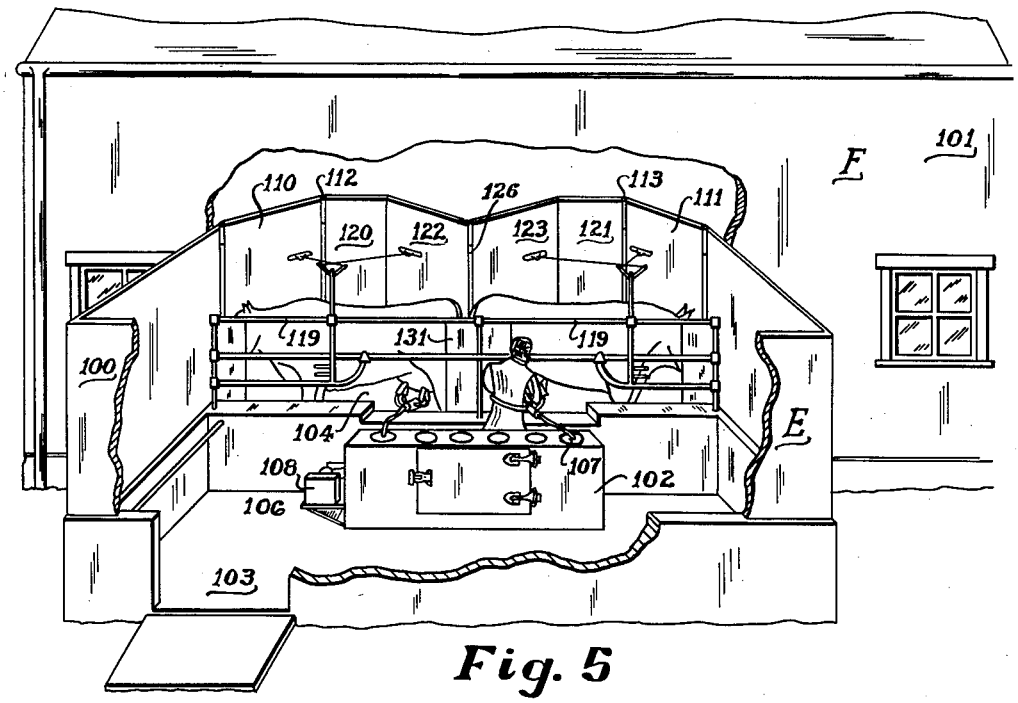
Figure 5 is a perspective view of a third embodiment of the structure, with parts broken away.
Figure 6:
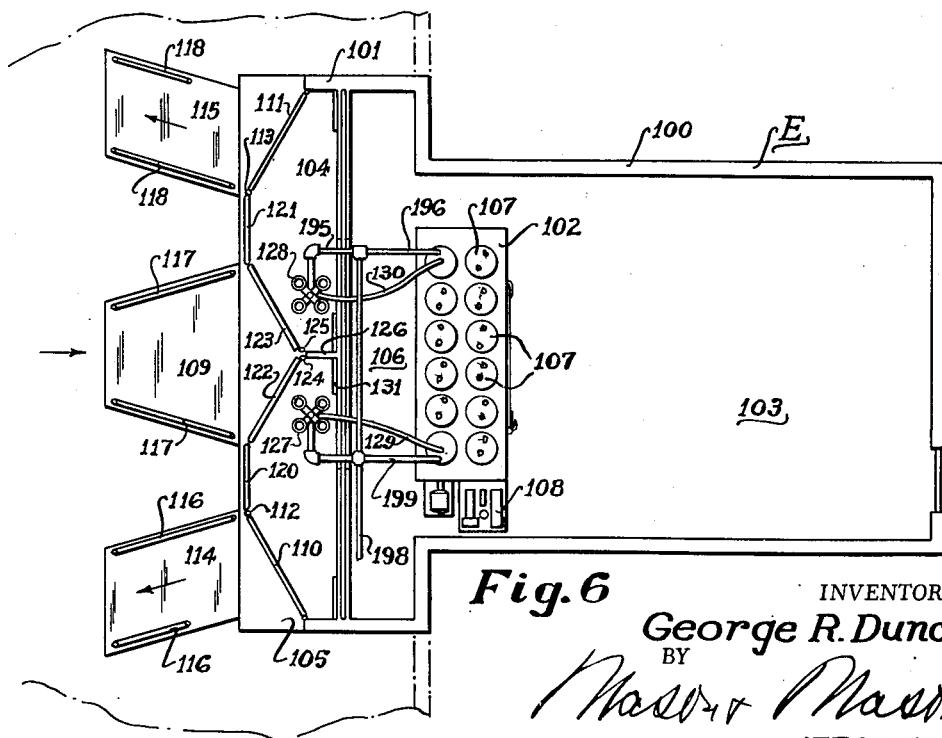
Figure 6 is a plan view of the structure shown in Figure 5.

The structure illustrated in Figures 5 and 6 is similar to that shown in Figures 1 and 2. In these figures, the milk house is shown at E. The loafing barn is shown at F. The milk house is provided with walls 100 and the loafing barn with walls 101. Located within the milk house is a mechanical refrigerator 102, a floor 103 which is located below the floor 104 forming part of the ramp 105. There is an aisle 106 that is used by the milking operator which is on the same level or substantially the same level as the floor 103.

The refrigerator is provided with a plurality of openings which are closed by covers 107, and the refrigerator mechanism is indicated by 108.

Each animal is led up the inclined portion 109 and may be tied to the doors 110 or 111 which are pivoted at 112 and 113, respectively. The inclined portions 114 and 115 form exits for the animals following the milking operations whereby the animals, as they leave the milking station, will not interfere with the entrance of unmilked animals as they approach the milking station. Suitable railings 116, 117 and 118 are provided to guide the animals as they enter and leave the milking parlor. As shown in the figures, the aisle 106 is separated from the elevated floor of the ramp, which latter constitutes the milking parlor, by a railing 119, although other partition means may be provided. In addition to the doors 110 and 111 it will be seen, by referring to the figures, that there are auxiliary walls 120 and 121, and inner pivoted doors 122 and 123 which are pivoted at 124 and 125, respectively. When these doors are swung toward each other, they form a central partition extending partially into the inclined inlet portion 109, thereby serving as guides so that one animal may turn to the right and the other animal may turn to the left. The partition 126 mounts the pivots 124 and 125.

As seen in the figures, the teat cups 127 and 128 are each provided with conduits 129 and 130, respectively, leading to the openings 107. They pass through these openings and into ordinary milk cans, not shown, such as are illustrated in my applications and patent referred to above. A baffle plate 131 may be attached to the railing 119, as seen in the figures.

The arrangement shown in Figures 5 and 6 provides a means for expeditiously milking a plurality of cows within a minimum of time and in an entirely sanitary manner whereby the milk may pass directly from the cows into the milk cans located within the refrigerator. The vacuum line is shown at 195, 196, 198 and 199.

The vacuum line pulls a vacuum on all of the cans to be filled. This same vacuum pulls the milk from the teat cups into the cans, as more specially illustrated in my copending application filed concurrently herewith.

The structure shown in Figure 7 includes a milk house G and a milking parlor H. As in the other figures, the milk house is provided with walls 150 and a floor 151 which is below the level of the ramp 152 forming part of the milking parlor. The inclined inlet is shown at 153 and the inclined outlets are indicated at 154 and 155. Two of the walls of the milk house are preferably provided with openings 156 and 157. The suction and milk pipes are indicated at 158, 159, 160 and 161. These extend through the openings 156 and 157 and are connected to the teat cups 162 and 163. The milk pipes 161 lead to weighing devices indicated generally at 164 and 165. These are supported by arms 166 and 167 which extend from the side walls 150. Outlets from the weighing devices 164 and 165 are indicated at 168 and 169, respectively. These lead through the refrigerator closures 170 to milk cans located within the refrigerator 171, not shown.

The inclined ramp inlet 153 is provided with a door 172 pivoted at 173. The ramp outlet 155 is provided with a door 174 pivoted at 175, on which is mounted the feeding device 176. The inclined ramp outlet 154 is provided with a door 177 pivoted at 178 and having feeding means 179. It is to be understood that the animals will be suitably secured in position for the milking operation, and they may be fed at this time by the feeding means 176 and 179. The milking parlor is provided with a sump 180 having a drain 181. The meeting portions 182 of the wall 150 form a shield. The milk house may be provided with suitable wash tubs 183, hot water heater 184 and container 185.

A pipe union 198 is provided to connect the suction pipes 158 and 159 to a source of minus pressure, as is provided in milking machine apparatus, or as shown at 99 in Figure 4.

The structure shown in Figure 7 enables the milking operator to expeditiously milk one or two cows in a sanitary manner. The structure is such that the animals do not interfere with each other during their entrance or exit from the milking parlor. Following the milking operation, they may be led away to a loafing barn or to pasture.

In the claims, the term "milking parlor" includes the stall or stalls where one or more animals are secured during the milking operation.

With the construction shown in the several figures herein, complete sanitation is achieved because the milk flows directly from the cows, through the wall of the milk house, into the cans within the refrigerator, thereby being immediately chilled. The milk in these cans may be delivered directly to the dairy which bottles it, without being touched by human hands or subjected to any other deleterious influences.

In the claims the term "divergent" means extending at any angle to each other including a 180° angle. The term is used to describe the relation to each other of the stations or stalls on the raised platform, which is hereby defined as the space where the animals remain while the milking operation is proceeded with until completed. In Figure 2 one animal occupies the position between the door 35 and its pivot 37 and the station. This space provides one station or stall. The other station or stall lies between station and door or gate 36 and its pivot 38. These stalls are at an angle of 180° to each other. These stalls are therefore in accordance with the above definition divergent to each other. In Figure 3 the pit 96 separates the stalls from each other. Such stalls whose opposite ends are defined by doors 79 and 81 are also divergent.

In Figure 6 the stalls are separated by partition 126, and in Figure 7 the sump 180 separates one stall from the other both of whose ends are closed by doors, such as the doors 174 and 177.

The foregoing description of the invention is explanatory thereof and various changes in the size, shape and of the materials used, as well as in the details of the illustrated construction, may be made, within the scope of the appended claims, without departing from the spirit of the invention.

I claim:

1. In a structure for milking farm animals and for conveying the milk to cooled containers as it comes from the animals comprising a separate solid-partition forming a compartment, said partition having a plurality of doors leading to an area outside of said compartment, said compartment having therein a platform having thereon means defining a pair of stalls for positioning two farm animals with their backs adjacent and their udders in close proximity to each other, mechanical milking means including two sets of teat cups located in close proximity to each other adjacent the animals' udders whereby each set may be readily attached for milking the said pair of farm animals, a milk receiving section having therein a mechanical refrigerator adapted to support a plurality of milk cans, said mechanical milking means further including milk line means connected to each set of teat cups and leading into said refrigerator for connection into a milk can located within said refrigerator.

2. In a structure for milking farm animals and for conveying the milk to cooled containers as it comes from the animals comprising a separate solid-partition forming a compartment, said partition having a plurality of doors leading to an area outside of said compartment, said compartment having therein a platform having thereon means defining a pair of divergent stalls for positioning two farm animals with their backs adjacent and their udders in close proximity to each other, mechanical milking means including two sets of teat cups located in close proximity to each other adjacent the animals' udders whereby each set may be readily attached for milking the said pair of farm animals, a milk receiving section having therein a mechanical refrigerator adapted to support a plurality of milk cans, said mechanical milking means further including milk line means connected to each set of teat cups and leading into said refrigerator for connection into a milk can located within said refrigerator.

3. In a structure for milking farm animals and for conveying the milk to cooled containers as it comes from the animals comprising a separate solid-partition forming a compartment, said partition having a plurality of doors leading to an area outside of said compartment, said compartment having therein a raised platform having thereon means defining a pair of stalls for positioning two farm animals with their backs adjacent and their udders in close proximity to each other, mechanical milking means including two sets of teat cups located in close proximity to each other adjacent the animals' udders whereby each set may be readily attached for milking the said pair of farm animals, a milk receiving section having therein a mechanical refrigerator adapted to support a plurality of milk cans, said mechanical milking means further including milk line means connected to each set of teat cups and leading into said refrigerator for connection into a milk can located within said refrigerator.

4. In a structure for milking farm animals and for conveying the milk to cooled containers as it comes from the animals comprising a separate solid-partition forming a compartment, said partition having a plurality of doors leading to an area outside of said compartment, said compartment having therein a raised platform having thereon means defining a pair of stalls for positioning two farm animals with their backs adjacent and their udders in close proximity to each other, mechanical milking means including two sets of teat cups located in close proximity to each other adjacent the animals' udders whereby each set may be readily attached for milking the said pair of farm animals, a milk receiving section having therein a mechanical refrigerator adapted to support a plurality of milk cans, said mechanical milking means further including milk line means connected to each set of teat cups and leading into said refrigerator for connection into a milk can located within said refrigerator and a milker's station located below and to one side of said raised platform.

5. In a structure for milking farm animals and for conveying the milk to cooled containers as it comes from the animals comprising a separate solid-partition forming a compartment, said partition having a plurality of doors leading to an area outside of said compartment, said compartment having therein a raised platform having thereon means defining a pair of stalls for positioning two farm animals with their backs adjacent and their udders in close proximity to each other, mechanical milking means including two sets of teat cups located in close proximity to each other adjacent the animals' udders whereby each set may be readily attached for milking the said pair of farm animals, a milk receiving section having therein a mechanical refrigerator adapted to support a plurality of milk cans, said mechanical milking means further including milk line means connected to each set of teat cups and leading into said refrigerator for connection into a milk can located within said refrigerator and a single inlet ramp leading to the central portion of said platform and a pair of exit ramps leading from adjacent the ends of said platform.

6. In a structure for milking farm animals and for conveying the milk to cooled containers as it comes from the animals comprising a separate solid-partition forming a compartment, said partition having a plurality of doors leading to an area outside of said compartment, said compartment having therein a raised platform having thereon means defining a pair of stalls for positioning two farm animals with their backs adjacent and their udders in close proximity to each other, mechanical milking means including two sets of teat cups located in close proximity to each other adjacent the animals' udders whereby each set may be readily attached for milking the said pair of farm animals, a milk receiving section having therein a mechanical refrigerator adapted to support a plurality of milk cans, said mechanical milking means further including milk line means connected to each set of teat cups and leading into said refrigerator for connection into a milk can located within said refrigerator and inlet and exit ramps extending in a direction which is parallel to said platform.

7. In a structure for milking farm animals and for conveying the milk to cooled containers as it comes from the animals comprising a separate solid-partition forming a compartment, said partition having a plurality of doors leading to an area outside of said compartment, said compartment having therein a raised platform having thereon means defining a pair of stalls for positioning two farm animals with their backs adjacent and their udders in close proximity to each other, mechanical milking means including two sets of teat cups located in close proximity to each other adjacent the animals' udders whereby each set may be readily attached for milking the said pair of farm animals, a mechanical refrigerator adapted to support a plurality of milk cans, said mechanical milking means further including milk line means connected to each set of teat cups and leading into said refrigerator for connection into a milk can located within said refrigerator, a milk room at a lower level than said platform, each of said pair of stalls including said platform forming a right angle, and said partition compartment forming a right angle, and a plurality of exits and an inlet to said platform.

8. In a structure for milking farm animals and for conveying the milk to cooled containers as it comes from the animals comprising a separate solid-partition forming a compartment, said partition having a plurality of doors leading to an area outside of said compartment, said compartment having therein a raised platform having thereon means defining a pair of stalls for positioning two farm animals with their backs adjacent and their udders in close proximity to each other, mechanical milking means including two sets of teat cups located in close proximity to each other adjacent the animals' udders whereby each set may be readily attached for milking the said pair of farm animals, a mechanical refrigerator adapted to support a plurality of milk cans, said mechanical milking means further including milk line means connected to each set of teat cups and leading into said refrigerator for connection into a milk can located within said refrigerator, a milk room at a lower level than said platform, and an additional solid partition in a plane substantially parallel to the plane of the said first partition.

9. In a structure for milking farm animals and for conveying the milk to cooled containers as it comes from the animals comprising a separate solid-partition forming a compartment, said partition having a plurality of doors leading to an area outside of said compartment, said compartment having therein a raised platform having thereon means defining a pair of stalls for positioning two farm animals with their backs adjacent and their udders in close proximity to each other, mechanical milking means including two sets of teat cups located in close proximity to each other adjacent the animals' udders whereby each set may be readily attached for milking the said pair of farm animals, a mechanical refrigerator adapted to support a plurality of milk cans, said mechanical milking means further including milk line means connected to each set of teat cups and leading into said refrigerator for connection into a milk can located within said refrigerator, a milk room at a lower level than said platform, and an additional partition in a plane parallel to said partition first named and doors separating said partitions at the ends thereof.

10. In a structure for milking farm animals and for conveying the milk to cooled containers as it comes from the animals comprising a separate solid-partition forming a compartment, said partition having a plurality of doors leading to an area outside of said compartment, said compartment having therein a raised platform having thereon means defining a pair of stalls for positioning two farm animals with their backs adjacent and their udders in close proximity to each other, mechanical milking means including two sets of teat cups located in close proximity to each other adjacent the animals' udders whereby each set may be readily attached for milking the said pair of farm animals, a mechanical refrigerator adapted to support a plurality of milk cans, said mechanical milking means further including milk line means connected to each set of teat cups and leading into said refrigerator for connection into a milk can located within said refrigerator, a milk room at a lower level than said platform, inlet and exit ramps leading to said platform, said doors comprising pivoted doors located between said ramps and said platform for permitting or preventing access to or egress from said raised platform.

11. In a structure for milking farm animals and for conveying the milk to containers as it comes from the animals comprising a separate solid-partition forming a compartment, said partition having a plurality of doors leading to an area outside of said compartment, said compartment having therein a platform having thereon means defining a pair of stalls for positioning two farm animals with their backs adjacent and their udders in close proximity to each other, mechanical milking means including two sets of teat cups located in close proximity to each other adjacent the animals' udders whereby each set may be readily attached for milking the said pair of farm animals, a milk receiving section including therein refrigerating means, and conduit means interconnecting said milking means and said refrigerator means.

12. In a structure for milking farm animals and for conveying the milk to containers as it comes from the animals comprising a separate solid-partition forming a compartment, said partition having a plurality of doors leading to an area outside of said compartment, said compartment having therein a raised platform having thereon means defining a pair of stalls for positioning two farm animals with their backs adjacent and their udders in close proximity to each other, mechanical milking means including two sets of teat cups located in close proximity to each other adjacent the animals' udders whereby each set may be readily attached for milking the said pair of farm animals, and means for receiving said milk from said milking means, a milk house having a floor at a lower level than said raised platform, said milk house containing said means for receiving said milk from said milking means.

13. A combination with a barn, a structure for milking farm animals and for conveying the milk to containers as it comes from the animals, comprising a separate solid-partition forming a compartment having door means leading to said barn and forming part of said partition and having therein a platform having thereon means defining a pair of stalls for positioning two farm animals with their backs adjacent and their udders in close proximity to each other, mechanical milking means including two sets of teat cups located in close proximity to each other adjacent the animals' udders whereby each set may be readily attached for milking the said pair of farm animals, a milk receiving section including therein refrigerator means, means within said refrigerator means for receiving said milk from said milking means, and conduit means interconnecting said milking means and said last-named means.

GEORGE R. DUNCAN.

REFERENCES CITED

The following references are of record in the file of this patent:

UNITED STATES PATENTS

| Number | Name | Date |
|---|---|---|
| 712,529 | Henry | Nov. 4, 1902 |
| 982,161 | Smaill, Jr. | Jan. 17, 1911 |
| 1,798,413 | Graves | Mar. 31, 1931 |
| 1,952,544 | Gordon | Mar. 27, 1934 |
| 2,081,947 | McCornack | June 1, 1937 |
| 2,469,519 | Redin et al. | May 10, 1949 |
| 2,472,122 | Polivka | June 7, 1949 |

FOREIGN PATENTS

| Number | Country | Date |
|---|---|---|
| 10,734 | Great Britain | A. D. 1908 |
| 14,887 | Great Britain | A. D. 1908 |
| 219,657 | Germany | Sept. 30, 1908 |
| 109,993 | Australia | Mar. 4, 1940 |

OTHER REFERENCES

Farm Implement and Machinery Review, page 645, November 1, 1946.